Nov. 17, 1953 H. W. JONES ET AL Re. 23,737

BALING PRESS

Original Filed April 25, 1949 5 Sheets-Sheet 1

INVENTORS
Harry W. Jones
BY Guilford Glazer.

Cameron, Kerkam & Sutton
ATTORNEYS

BALING PRESS

Original Filed April 25, 1949 5 Sheets-Sheet 2

INVENTORS
Harry W. Jones
BY Guilford Glazer.

Cameron, Kerkam + Sutton
ATTORNEYS

BALING PRESS

Original Filed April 25, 1949 5 Sheets-Sheet 3

INVENTORS
Harry W. Jones
BY Guilford Glazer.
Cameron, Kerkam & Sutton
ATTORNEYS

BALING PRESS

Original Filed April 25, 1949 5 Sheets-Sheet 4

INVENTORS
Harry W. Jones
BY Guilford Glazer.
Cameron, Kerkam & Sutton
ATTORNEYS

BALING PRESS

Original Filed April 25, 1949 5 Sheets-Sheet 5

INVENTORS
Harry W. Jones
BY Guilford Glazer.

Cameron, Kerkam & Sutton
ATTORNEYS

Reissued Nov. 17, 1953

Re. 23,737

UNITED STATES PATENT OFFICE 23,737

BALING PRESS

Harry W. Jones and Guilford Glazer, Knoxville, Tenn., assignors to Dempster Brothers, Incorporated, Knoxville, Tenn., a corporation of Tennessee Original No. 2,616,312, dated November 4, 1952, Serial No. 89,436, April 25, 1949. Application for reissue February 3, 1953, Serial No. 334,987

11 Claims. (Cl. 78—0.5)

Matter enclosed in heavy brackets [ ] appears in the original patent but forms no part of this reissue specification; matter printed in italics indicates the additions made by reissue.

This invention relates to baling presses, and more particularly to means for compacting the charge in the charging box preliminarily to the baling operation. The invention possesses particular utility in conjunction with baling presses for baling scrap metal, and therefore it will be illustrated and described in its application to baling presses of that character, but as will be apparent to those skilled in the art the invention in its broader aspects possesses utility for application to baling presses of other types.

Commonly used baling presses for baling scrap metal include a charging box into which the material to be baled is dumped in any suitable way, after which the top opening in the charging box is closed by a horizontally movable door which slides on the top of the box into cooperating relationship with certain wedging mechanism at the forward end of the box. Thereafter suitable compression heads, operable by rams disposed at right angles to each other, are operated in sequence to crush and compress the material into a bale. As is apparent, material charged into the box must not project above the edge of the box because any material projecting through the open top of the box will interfere with the closing of the door. Furthermore, it is desirable that the material in the box be disposed compactly so that the ultimate bale will contain as much material as permitted by the capacity of the press to crush and compress the charge. To avoid upwardly projecting material and to secure compactness of the charge in the box preliminarily to the baling operations considerable manual labor has necessarily been entailed in arranging the material in the box. It is also common practice for foot tamping to be applied to the charge in order to compact it in the box, but the effectiveness of this manner of compacting the charge is limited by the weight of the workman and manual rearrangement of pieces within the box is frequently required even when foot tamping is used.

It is an object of this invention to provide a baling press of the character referred to with mechanical means for compacting the charge in the box and thereby avoiding the necessity for manual arrangement of the pieces or foot tamping.

Another object of this invention is to provide an improved device of the type characterized which is capable of producing such a compact charge in the box preliminarily to the baling operations as would otherwise be obtained only by the exercise of extreme care in arranging the charge in the box.

Another object of this invention is to provide an improved device of the type characterized which facilitates the use of mechanical means for dumping the charge into the charging box by avoiding the necessity for rearrangement of the charge after it has been dumped.

Another object of this invention is to provide an improved device of the type characterized which may be readily applied to existing presses as well as incorporated in new presses, and which is of such character that it may be readily operated by unskilled labor.

Another object of this invention is to provide an improved device of the type characterized which is strong and durable, composed of parts that are inexpensive to fabricate and assemble, and simple in operation.

Other objects will appear as the description of the invention proceeds.

By way of summary, the present invention includes a compacting device associated with the charging box and its door and compression heads and provided with mechanical operating means, preferably a fluid operated device, for moving said compacting device bodily into and out of the open top of the charging box to compress the charge therein, so as not only to free the opening of the box from upwardly projecting pieces which would interfere with the closing of the door but also to effect a compacting of the charge in the box by mechanically applied pressure.

The invention is capable of receiving a variety of mechanical expressions, two of which have been illustrated on the accompanying drawings, but it is to be expressly understood that the drawings are for purposes of illustration only, and are not to be interpreted as a definition of the limits of the invention, reference being had to the appended claims for that purpose.

In the accompanying drawings wherein the component mechanism of the baling press, to the extent that it is already available on the market, has been shown diagrammatically to avoid complication as to details constituting no part of the present invention, Fig. 1 is a side elevation of a baling press incorporating the present invention;

Figure 1:
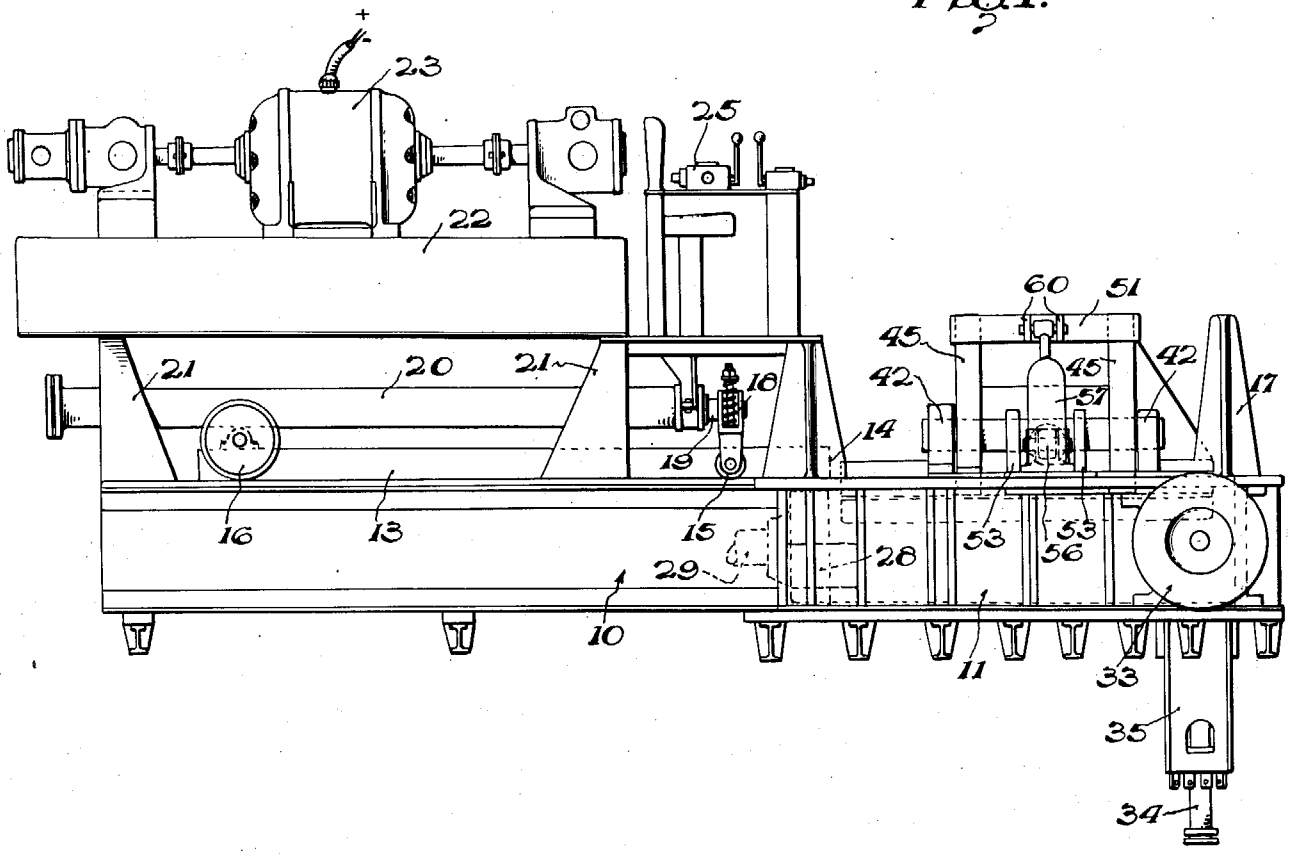

Referring in detail to the accompanying drawings, wherein the same reference characters are employed in the several figures to designate corresponding parts, 10 is a base frame, of any suitable size and construction, with which is associated a rectangular charging box 11, of any suitable size and construction, having an open top 12.

Slidably mounted on the base frame 10 is a door 13, shown in its open position in Fig. 1, the forward end of the door being designated 14. Door 13 is mounted on suitable rollers 15 and 16 so that it may be slid to the right as viewed in Fig. 1 to close the open mouth 12 in the box 11, in which latter position the forward end 14 of the door cooperates with suitable wedging mechanism carried by a suitable bracket 17 to lock the door against upward movement. To slide the door into and out of its closed position said door is connected by any suitable connecting means 18 to the piston rod 19 of a hydraulic ram 20 supported in any suitable brackets 21 from the base frame 10. The frame also carries an oil tank 22 on which is mounted a motor 23 for driving a suitable pump to develop hydrostatic pressure for use in the ram 20 and in the other hydraulic devices to be referred to. Suitable controls are indicated at 25.

Figure 2:
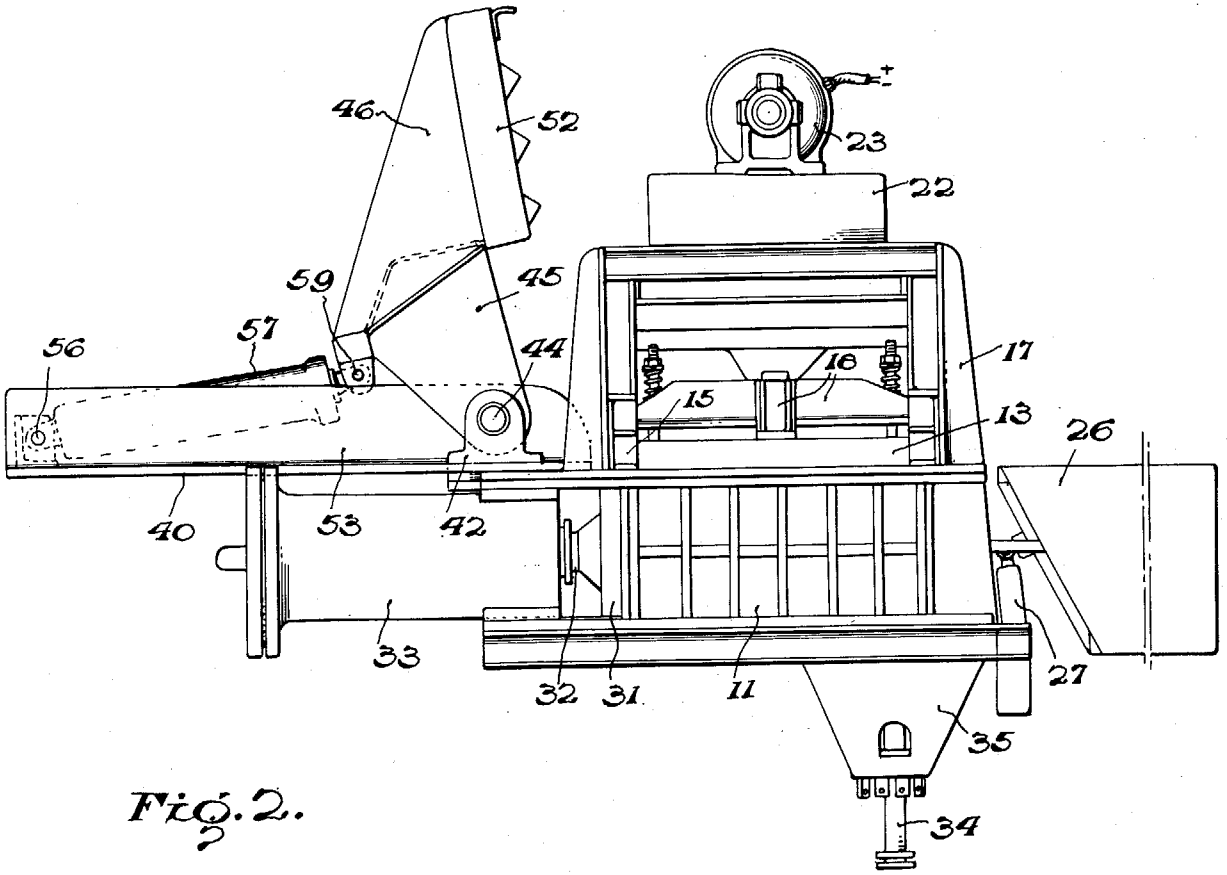
Figure 2 is an end view of the baling press of Fig. 1.

Referring to Fig. 2, a hopper 26 is pivotally mounted in association with one side of the charging box 11, and is actuated by a hydraulic device 27 so that when the material to be baled has been delivered to the hopper 26 in any suitable way the hopper may be swung from the position shown in Fig. 2 to an inverted position sufficient to dump its contents into the open mouth 12 of the charging box.

Figure 5:
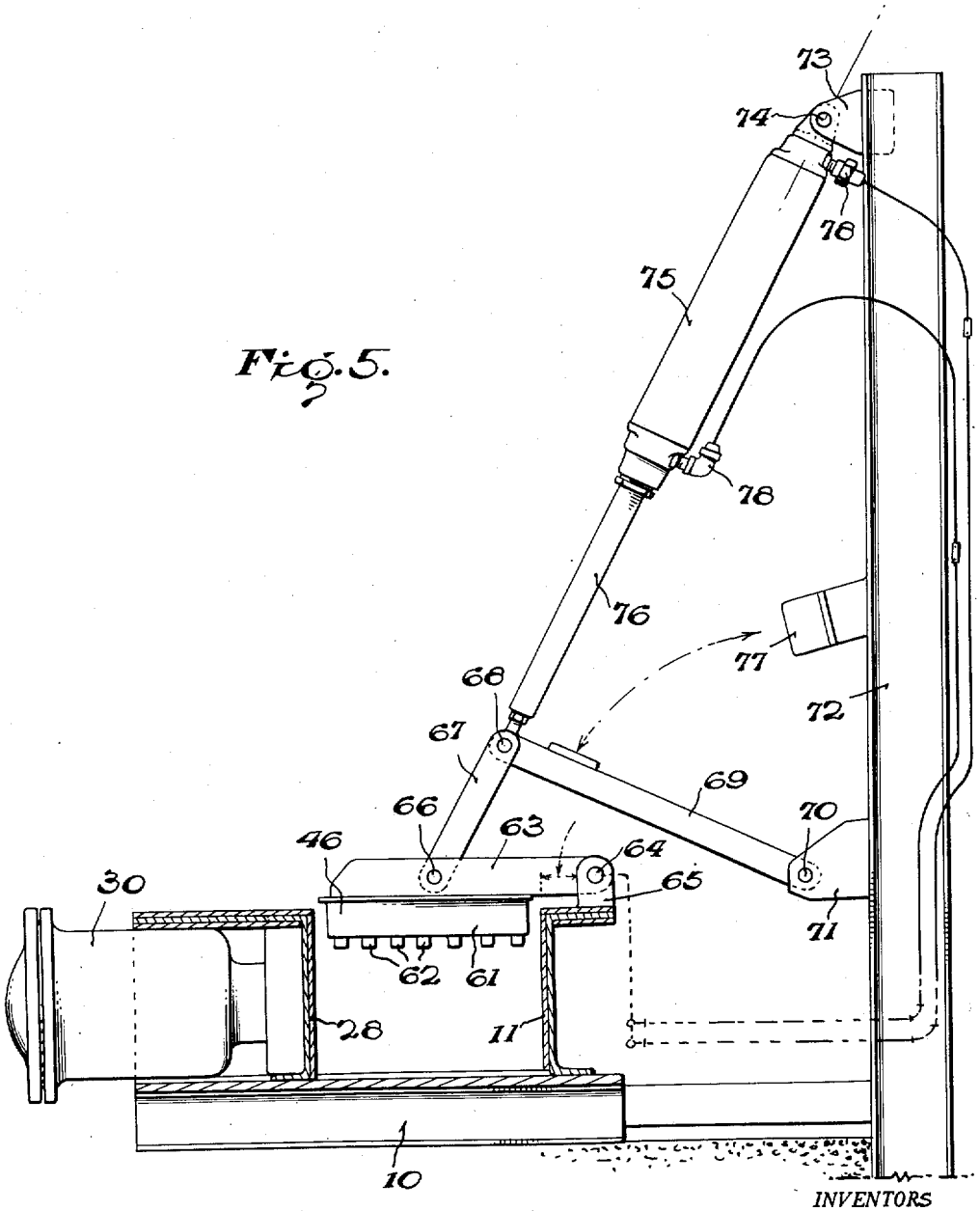
Fig. 5 is a side view of an alternative embodiment of the compacting device and its operating mechanism.

The rear side of the charging box is constituted by a main compression head 28, shown in dotted lines in Fig. 1 and in full lines in Fig. 5, said main compression head being connected to the piston rod 29 of a hydraulic ram 30 carried by the base frame 10. After the door 13 is closed and locked, the ram 30 is operated to move the main compression head, to the right as viewed in Fig. 1, to crush and compress the material into the right-hand end of the box 11 as viewed in Fig. 1. That portion of a side wall of the box which is at right angles to the main compression head 28 and which is located at the forward end of the box 11 as viewed in Fig. 1 is constituted by a second compression head 31, as shown in Fig. 2, that is connected to the piston rod 32 of a hydraulic ram 33 also carried by the base frame 10. When the main compression head 28 has completed its forward stroke, ram 33 is actuated to move the compression head 31 at right angles to the main compression stroke to crush and compress the charge into that corner of the box which is at the forward end of the box and opposite the ram 33, completing the bale. That portion of the bottom wall of the box which underlies the completed bale is constituted by the head of a hydraulic device 34, carried by a suitable support 35 at the underside of the box 11, so that upon actuation of the hydraulic device 34 the finished bale, after the compression heads 28 and 31 have been withdrawn and the door 13 has been opened, may be elevated to at least the level of the open top of the box 11 to facilitate removal of the bale.

A suitable hydraulic system is connected to the several hydraulic devices and includes suitable valves for admitting hydrostatic pressure to the hydraulic devices in proper sequence to effect the closure of the door 13, the successive movement of the compression heads 28 and 31 on their baling strokes, and the actuation of the ejecting mechanism 34, all as well understood in the art. As the mechanism so far described is to be found in baling presses already on the market, further description of the details of construction, arrangement and operation thereof is deemed unnecessary.

In conformity with the present invention an auxiliary compacting device is pivotally mounted at the side of the charging box 11 and mechanically operated, preferably by fluid pressure, to compact the charge dumped into the charging box 11, as by the hopper 26, as well as to free the open top 12 of said box to permit closure of tse door 13.

Figure 3:
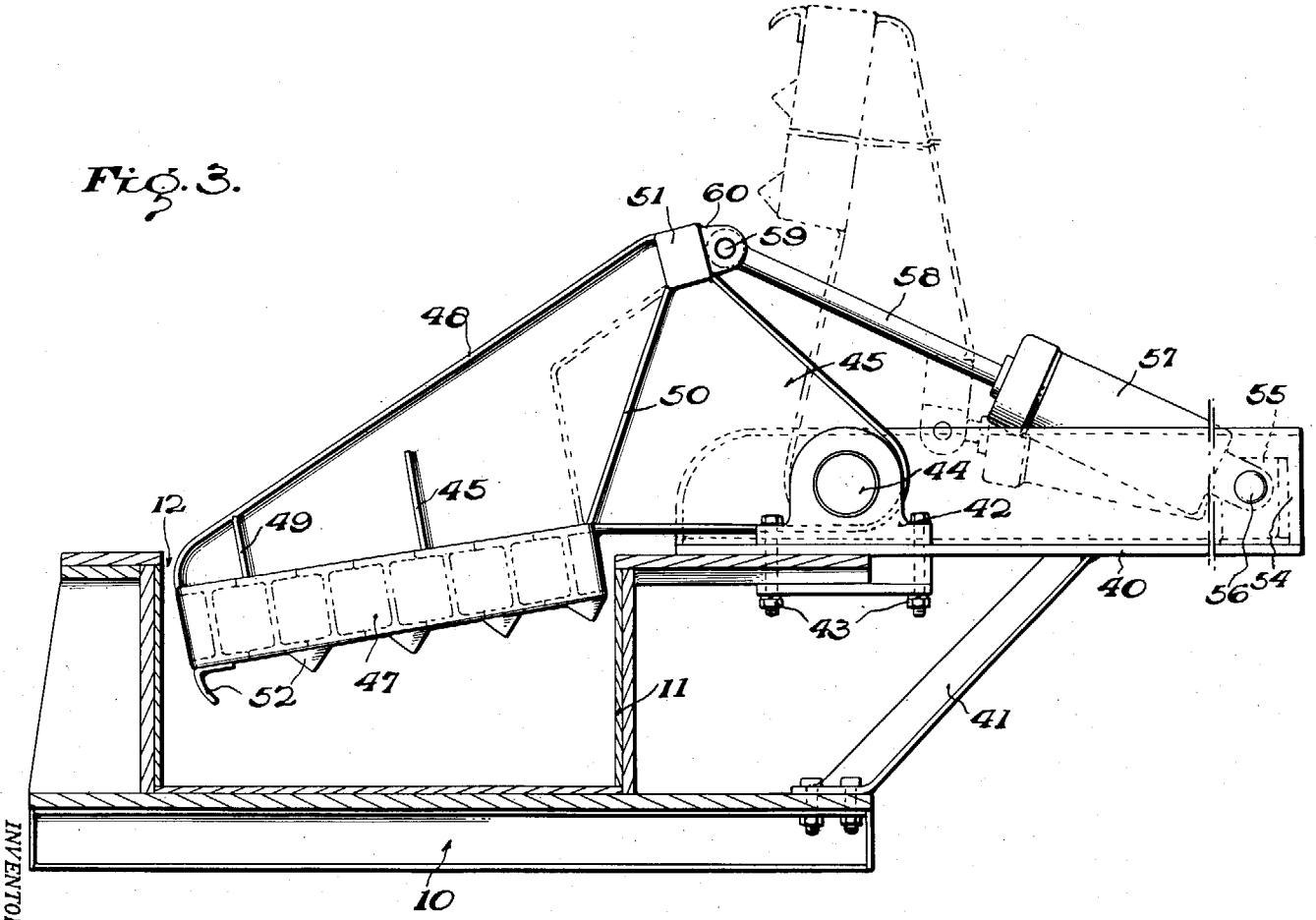
Fig. 3 is a side view, to an enlarged scale, of the compacting device and its operating mechanism.
Figure 4:
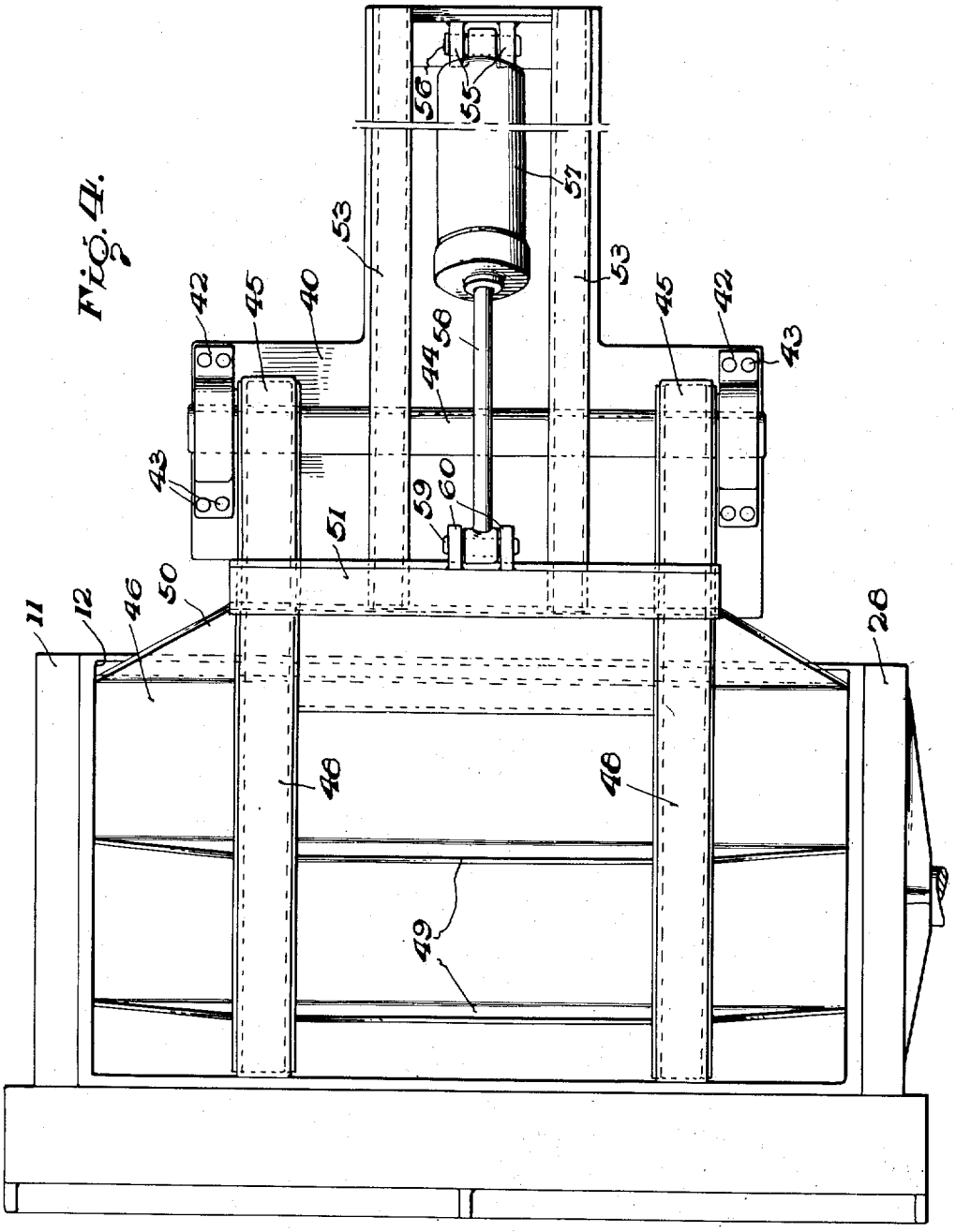
Fig. 4 is a top view of the mechanism shown in Fig. 3.

Referring now particularly to Figs. 3 and 4, a platform 40 is provided in any suitable way at the side of the box, being shown as attached to the side of the box and supported from the base frame 10 by one or more suitable braces 41 to provide adequate strength and rigidity. Spaced bearing blocks 42 are secured to said platform in any suitable way, as by bolts and nuts 43, and pivotally mounted in said bearing blocks 42 is a stub shaft 44. Secured to said stub shaft 44 adjacent the bearing blocks 42 are a pair of arms 45, which may be of any suitable construction to afford adequate strength and rigidity, being shown as of generally triangular shape in side view and formed of plates and angle irons so as to have a generally box-like formation. Secured to said arms in any suitable way is a compacting device 46 which may also be of any suitable construction so as to afford adequate strength and rigidity, said device being commonly referred to as a "compression door" and being so termed hereinafter. As illustrated, said door has a generally rectangular box-like body portion 47, which may be built up of I beams and plates, provided with suitable reinforcing members 48, which may be extensions of the arms 45 and be formed of plates and angle irons, and transverse reinforcing plates 49, one of which designated 50 is secured to a rigid transverse member 51 which is also rigidly secured to the reinforcing members 48, said plate 50 and transverse member 46 being also rigidly secured to the arms 45 in any suitable way. The under face of the body 47 of the compression door is also preferably provided with a plurality of transversely extending projecting members 52 to aid in the compacting action by applying localized pressures on the material in the box and to resist transverse movement of said material under the pressure of the door.

Platform 40 also carries rigid elongated members 53 of any suitable construction forming a channel therebetween and through which passes the stub shaft 44. At the right-hand end of said channel as viewed in Fig. 4 is a rigid transverse member 54 having lugs 55 in which is mounted, by means of a pivot pin 56, the end of a hydraulic cylinder 57 whose piston rod 58 is pivotally connected to the aforesaid cross pieces 51 by means of a pivot pin 59 mounted in lugs 60 provided in any suitable way on said cross piece 51. Hydraulic cylinder 57 is provided with any suitable fluid connections, not shown (compare 78 in Fig. 5), for admitting hydraulic fluid thereto to effect the operation next to be described.

The normal position of the compression door 46 is shown in Fig. 2, i. e., with the compression door 46 in an upright position so as not to obstruct the open top of the charging box 11. When a charge has been delivered to said charging box 11, as by the hopper 26, hydraulic fluid is admitted to that end of the cylinder 57 which is adjacent its pivotal mounting, whereupon through the actuation of the piston rod 58 pivotally connected to the door 46 at 59, 60, said door is swung from the position shown in Fig. 2 to the position shown in Fig. 3. The compression door in plan is of such size as substantially to fill with small clearance the open top 12 of the charging box 11 as shown in Fig. 4, and therefore the movement of the compression door 46 to or toward the position shown in Fig. 3 will force into the box any pieces projecting through the open top of the box and also compact the material in the box. The compression door may, if desired, be operated a plurality of times during the filling of the box 11 so as to assure that the charge therein is tamped to maximum compactness. When through operation of the compression door the charge has been adequately compacted and the opening at the top thereof freed of any projecting pieces, the compression door is returned to the position shown in Fig. 2 through admission of hydraulic fluid to the opposite end of the cylinder 57, and thereafter the door 13 is closed as before explained, whereupon the baling operation proceeds to the completion of the bale and the ejection of the same.

Fig. 5 illustrates an alternative embodiment wherein the compression door 46 has a box-like body 61, which may be of the same or similar construction to that above referred to with respect to the body 47, the under face of the compression door being shown as provided with projecting members 62 for the purpose above referred to. Secured to the upper portion of the compression door 46, and shown as constituting reinforcing members for the door, are a pair of arms 63 pivotally mounted at 64 on lugs 65 provided in any suitable way on a suitable support at the side of the box. Pivotally connected to the arms 63 at 66 is a link 67 which is pivotally connected at 68 to a second link 69 that is pivotally mounted at 70 on lugs 71 provided in any suitable way on an upright 72 associated in any suitable way with the base frame 10. Also pivotally mounted on said upright 72 as by lugs 73 and a pivot pin 74 is a hydraulic cylinder 75 having a piston rod 76 and fluid connections 78, said piston rod being pivotally connected to the links 67 and 69 at the pivotal connection 68.

While the charging box 11 is being filled the hydraulic mechanism 75, 76 is contracted to swing the compression door 46 to an upright position in which position it may be stopped by a suitable stop member 77 provided in any suitable way on the upright 72. When the charge in the box 11 is to be compacted, fluid pressure is admitted to the cylinder 75 to force the compression door 46 to or toward the position shown in Fig. 5 so as to free the open top of the box from upwardly projecting pieces and compact the charge in the box as before described. When the compacting operation has been completed the compression door is returned to its upwardly extending position, whereupon the door 13 may be closed as before explained and the balling operations proceeded with.

It will therefore be perceived that by the present invention a balling press has been provided with a compression door which may be operated from the same hydraulic system that is provided for actuating the other hydraulic devices already provided on the balling press and which, when operated, exerts a compacting pressure on the charge in the box which is far in excess of what can be obtained by foot tamping and which assures the freeing of the open top of the box from upwardly projecting pieces as well as a compacting of the material in the box to an extent which could otherwise be obtained only by the exercise of great care in manually arranging the material in the box.

The compression door and its operating mechanism can be readily added to existing baling presses as well as incorporated in new presses, and in view of the simplicity of the operation thereof no particular skill is required to operate the same. The compression door may be readily built up of angle irons and plates with suitable reinforcement members so as to give it adequate rigidity and strength without excessive weight, and the component parts of the door and its operating mechanism are all of simple construction so that the parts are inexpensive to fabricate and assemble. Thereby a strong, durable and highly efficient compression door has been provided which assures compacting of the charge without involving the manual labor or foot tamping heretofore required to secure maximum compactness in the box as well as the freeing of the open top of the box from upwardly projecting pieces. Therefore, the invention facilitates the use of mechanical loading means, such as the hopper referred to, because the charge may be properly compacted after it is dumped into the charging box notwithstanding the heterogenous condition of the charge resulting from the use of a mechanical loader.

While the embodiments of the invention illustrated on the drawings have been described with considerable particularity, it is to be expressly understood that the invention is not limited thereto, as the same may receive a variety of expressions, which will now be apparent to those skilled in the art, while changes may be made in the details of construction, arrangement, proportion, size, etc., and parts illustrated may be replaced by equivalent parts, without departing from the spirit of the present invention. Reference is therefore to be had to the claims hereto appended for a definition of the invention.

What is claimed is:

*1.* A baling press comprising a charging container having an open top, a bottom, and sides, a door arranged to close said open top, compression plunger means forming at least one of said sides and movable inwardly under said door when closed, and a pre-compacting means comprising a tamping head, a supporting arm attached to said head and pivotally [mounted] *mounting the head for swinging movement into and out of the container through* [adjacent] said open top, and operating means connected to said arm for swinging *the arm to move* said tamping head into and out of said container through said open top.

*2. A baling press comprising a charging container having an open top, a bottom, and sides, a door arranged to close said open top, compression plunger means forming at least one of said sides and movable inwardly under said door when closed, and a pre-compacting means comprising a tamping head pivotally mounting the head for* swinging movement into and out of the container through said open top, and operating means connected to said tamping head for swinging said tamping head into and out of said container through said open top.

3. A baling press comprising a charging container having an open top, a bottom and sides, a door arranged to close said open top, compression plunger means forming at least a portion of said sides and movable inwardly under said door when closed, and a tamping head pivotally mounted for swinging movement into and out of the container through the open top, and operating means connected to the tamping head for moving said tamping head into and out of said open top.

4. A baling press comprising a charging container having an open top, a bottom and sides, compression plunger means forming at least a portion of said sides and movable inwardly relatively of the container, a compression door, means pivotally mounting said door adjacent the open top in position for swinging movement into and out of said container through said open top, said door being proportioned relative to the open top in appreciably spaced relation from opposite sides and from the side opposite the pivot of the door at said open top when moved into the container clearing the adjacent side during the pivotal motion to clear said opposite sides an appreciable distance in compacting material in said container, and operating means connected to the compression door for moving said door into and out of said open top.

5. A baling press comprising a charging container having an open top, a bottom and sides, compression plunger means forming at least a portion of said sides and movable inwardly relatively of the container, a compression door, means attached to said compression door and pivotally mounted adjacent one side of the container for swinging the compression door into and out of said container through said open top, said door being spaced an appreciable distance from the sides of the container other than said pivot side sufficient to clear said side during the pivotal motion when the door is moved into the container, and operating means connected to the compression door for moving said door.

6. A baling press comprising a charging container having an open top, a bottom and sides, compression plunger means forming at least a portion of said sides and movable inwardly relatively of the container, a compression door, a supporting arm extending transversely of the back of the door and supporting the door thereon, means pivotally mounting said arm adjacent a side of the container above the top thereof for swinging movement of the compression door downwardly into the container appreciably below the pivotal support for the arm.

7. A baling press comprising a charging container having an open top, a bottom and sides, compression plunger means forming at least a portion of said sides and movable inwardly relatively of the container, a compression door, a supporting arm extending transversely of the back of the door and supporting the door thereon, means pivotally mounting said arm adjacent a side of the container above the top thereof for swinging movement of the compression door downwardly into the container appreciably below the pivotal support for the arm, said door being proportioned relative to the open top of the container and mounted on the arm and spaced from said pivot side of the container and from the opposite side thereof in said downward position.

8. A baling press comprising a charging container having an open top, a bottom and sides, compression plunger means forming at least a portion of said sides and movable inwardly relatively of the container, a compression door, means pivotally mounting said door adjacent the open top in position for swinging movement into and out of said container through said open top, said door being proportioned relative to the open top in appreciably spaced relation from opposite sides of said open top when moved into the container to clear said opposite sides an appreciable distance in compacting material in said container, and operating means connected to the compression door for moving said door into and out of said open top, means mounting said door for movement downward over the open top, and a plurality of spaced projecting members on the bottom face of the door to facilitate compacting material.

9. A baling press comprising a charging container having an open top, a bottom and sides, compression plunger means forming at least a portion of said sides and movable inwardly relatively of the container, a compression door, means pivotally mounting said door adjacent the open top in position for swinging movement into and out of said container through said open top, said door being proportioned relative to the open top in appreciably spaced relation from opposite sides of said open top when moved into the container to clear said opposite sides an appreciable distance in compacting material in said container, and operating means connected to the compression door for moving said door into and out of said open top, means mounting said door for movement downward over the open top, and a plurality of spaced transversely extending projecting members on the bottom face of the door to facilitate compacting material.

10. A baling press comprising a charging container having an open top, a bottom and sides, compression plunger means forming at least a portion of the sides and movable inwardly relatively to the container, a door substantially to close the open top, means pivotally mounting the door on the press adjacent one side of the container, a hopper externally of the container and upstanding beside the container laterally thereof, said hopper having a sloping wall extending upwardly outside the container beside the latter, means adjacent the upper end of said sloping wall pivotally mounting the hopper for upward swinging movement to dump the contents thereof into the open top of the container over the sloping wall.

11. A baling press comprising a charging container having an open top, a bottom and sides, compression plunger means forming at least a portion of the sides and movable inwardly relatively to the container, a door substantially to close the open top, means pivotally mounting the door on the press adjacent one side of the container, a hopper externally thereof, said hopper having a sloping wall extending upwardly outside the container beside the latter, and means adjacent the upper end of said sloping wall pivotally mounting the hopper on the side of the container opposite from the plunger means for upward swinging movement to dump the contents thereof

*into the open top of the container over the sloping wall.*

HARRY W. JONES.
GUILFORD GLAZER.

References Cited in the file of this patent or the original patent

UNITED STATES PATENTS

| Number | Name | Date |
|---|---|---|
| 1,033,089 | Dunn | July 23, 1912 |
| 1,766,642 | Jacobson et al. | June 24, 1930 |
| 1,812,797 | Lindemann | June 30, 1931 |
| 1,879,356 | Lindemann | Sept. 27, 1932 |
| 2,605,657 | Lindemann | Aug. 5, 1952 |

FOREIGN PATENTS

| Number | Country | Date |
|---|---|---|
| 320,437 | Italy | Dec. 20, 1932 |
| 489,229 | Germany | Dec. 24, 1929 |
| 791,164 | France | Sept. 23, 1935 |